United States Patent
Hsiao et al.

(10) Patent No.: US 12,265,838 B2
(45) Date of Patent: Apr. 1, 2025

(54) MODEL PROTECTION SYSTEM

(71) Applicant: MEDIATEK INC., Hsin-Chu (TW)

(72) Inventors: Chih-Hsiang Hsiao, Hsinchu (TW); Pei-Lun Suei, Hsinchu (TW); Yu-Chi Chu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 478 days.

(21) Appl. No.: 17/840,652

(22) Filed: Jun. 15, 2022

(65) Prior Publication Data

US 2023/0092808 A1    Mar. 23, 2023

Related U.S. Application Data

(60) Provisional application No. 63/324,643, filed on Mar. 29, 2022, provisional application No. 63/245,235, filed on Sep. 17, 2021.

(51) Int. Cl.
| | |
|---|---|
| G06F 9/46 | (2006.01) |
| G06F 3/06 | (2006.01) |
| G06F 9/455 | (2018.01) |
| G06F 21/53 | (2013.01) |

(52) U.S. Cl.
CPC ........ *G06F 9/45558* (2013.01); *G06F 3/0659* (2013.01); *G06F 21/53* (2013.01); *G06F 2009/45587* (2013.01)

(58) Field of Classification Search
CPC .................................................. G06F 9/45558
USPC ............................................................ 718/1
See application file for complete search history.

(56) References Cited

U.S. PATENT DOCUMENTS

| | | | | |
|---|---|---|---|---|
| 9,520,994 | B2* | 12/2016 | Ponsini | H04L 9/0877 |
| 10,395,029 | B1* | 8/2019 | Steinberg | G06F 21/53 |
| 12,073,005 | B2* | 8/2024 | Knierim | G06F 21/51 |
| 2009/0089527 | A1* | 4/2009 | Schoenberg | G06F 9/45558 |
| | | | | 711/E12.091 |
| 2012/0047580 | A1* | 2/2012 | Smith | G06F 21/53 |
| | | | | 726/26 |

(Continued)

FOREIGN PATENT DOCUMENTS

| | | |
|---|---|---|
| CN | 103258150 A | 8/2013 |
| CN | 107924441 A | 4/2018 |

(Continued)

OTHER PUBLICATIONS

Hsiao, the specification, including the claims, and drawings in the U.S. Appl. No. 17/853,950, filed Jun. 320, 2022.

(Continued)

*Primary Examiner* — Mehran Kamran
(74) *Attorney, Agent, or Firm* — Winston Hsu (57) ABSTRACT

A system for model protection includes a processor. The processor is arranged to execute a guest virtual machine (VM), a primary VM, and a hypervisor. The guest VM includes a model, and is arranged to send at least one command to a command hub. The primary VM is arranged to refer to the at least one command sent from the command hub to manage and configure a protection setting for a protected model derived from the model. The hypervisor is arranged to receive a safety setting command sent by the primary VM, and manage and configure the safety protection component according to the safety setting command, to set a read-only mode of the protected model.

19 Claims, 7 Drawing Sheets

(56) References Cited

U.S. PATENT DOCUMENTS

| | | | | |
|---|---|---|---|---|
| 2013/0347131 | A1* | 12/2013 | Mooring | G06F 21/556 |
| | | | | 726/29 |
| 2017/0149778 | A1* | 5/2017 | Gill | G06F 9/45558 |
| 2018/0189092 | A1* | 7/2018 | Sanchez Leighton | |
| | | | | G06F 9/45558 |
| 2019/0026035 | A1* | 1/2019 | Gokhale | G06F 11/1458 |
| 2020/0019697 | A1* | 1/2020 | Shen | G06N 3/02 |
| 2021/0026950 | A1* | 1/2021 | Ionescu | G06F 9/30101 |
| 2021/0149741 | A1* | 5/2021 | Mooring | G06F 9/4555 |
| 2021/0240638 | A1* | 8/2021 | Deutsch | G06F 12/1408 |
| 2022/0019698 | A1* | 1/2022 | Durham | H04L 9/0841 |
| 2022/0045853 | A1* | 2/2022 | Buendgen | H04L 9/3226 |
| 2022/0350631 | A1* | 11/2022 | Parry-Barwick | G06F 9/45558 |
| 2023/0092808 | A1* | 3/2023 | Hsiao | G06F 9/45558 |
| | | | | 718/1 |
| 2023/0169343 | A1* | 6/2023 | Lin | G06N 3/08 |
| | | | | 706/25 |

FOREIGN PATENT DOCUMENTS

| | | |
|---|---|---|
| CN | 109086100 A | 12/2018 |
| CN | 113330723 A | 8/2021 |
| EP | 2 606 450 A2 | 6/2013 |
| EP | 2 606 450 A3 | 6/2013 |
| EP | 2 606 450 B1 | 9/2015 |
| TW | 200842646 | 11/2008 |
| TW | 201833775 A | 9/2018 |
| TW | 201944280 A | 11/2019 |
| TW | 202113648 A | 4/2021 |
| TW | 202125224 A | 7/2021 |

OTHER PUBLICATIONS

Search Report mailed/issued on Feb. 10, 2023 for EP application No. 22186802.9, pp. 1~10.
Hsiao, the specification, including the claims, and drawings in the U.S. Appl. No. 17/849,694, filed Jun. 26, 2022.

* cited by examiner

MODEL PROTECTION SYSTEM

CROSS REFERENCE TO RELATED APPLICATIONS

This application claims the benefit of U.S. provisional application No. 63/245,235, filed on Sep. 17, 2021 and U.S. provisional application No. 63/324,643, filed on Mar. 29, 2022. The entirety of each of the above-mentioned patent applications is hereby incorporated herein by reference.

BACKGROUND

For artificial intelligence (AI) field, it is important to develop a protection scheme for protecting AI model being attacked. Conventionally, the AI model maybe injected to a kernel (e.g. a Linux kernel) of an operating system (OS; e.g. an Android system) for inference, and may be driven in the kernel. However, since all of the AI models of different applications (APPs) running on the OS are driven in the kernel, the AI models will be exposed when injected to the kernel or driven in the kernel. A crypted AI model may be decrypted and executed in an isolated execution environment (e.g. a trusted execution environment, TEE). It requires the support of a secure OS, and usually has a larger delay and less flexibility, which will cause problems for mass production. As a result, a novel architecture for model protection is urgently needed.

SUMMARY

It is therefore one of the objectives of the present invention to provide a system for model protection and a non-transitory machine-readable medium for storing a program code that provides model protection when executed, to address the above-mentioned issues.

According to at least one embodiment of the present invention, a system for model protection is provided. The system may include a processor. The processor may be arranged to execute a guest virtual machine (VM), a primary VM, and a hypervisor. The guest VM may include a model, and may be arranged to send at least one command to a command hub. The primary VM may be arranged to receive the at least one command sent from the command hub, and refer to the at least one command to manage and configure a protection setting for a protected model that is derived from the model. The hypervisor may be arranged to receive a safety setting command sent by the primary VM, and manage and configure a safety protection component according to the safety setting command, to set a read-only mode of the protected model.

According to at least one embodiment of the present invention, a non-transitory machine-readable medium for storing a program code is provided. When loaded and executed by a processor, the program code instructs the processor to execute: a guest virtual machine (VM), a primary VM, and a hypervisor. The guest VM may include a model, and may be arranged to send at least one command to a command hub. The primary VM may be arranged to receive the at least one command sent from the command hub, and refer to the at least one command to manage and configure a protection setting for a protected model that is derived from the model. The hypervisor may be arranged to receive a safety setting command sent by the primary VM, and manage and configure a safety protection component according to the safety setting command, to set a read-only mode of the protected model.

One of the benefits of the present invention is that, by setting a read-only mode of a protected model for a DMA circuit, such as an accelerated processing unit (APU), the protected model may not be modified during its life cycle for the APU (i.e. the integrity of the protected model may be protected). In this way, since an Android system or a Linux kernel of the Android system may not modify the protected model during inference, other illegal users may not utilize the protected model to perform attacks through the APU, and may not perform attacks on the protected model when the APU performs computations on the protected model. In addition, by setting a no-read/write mode of the protected model for a central processing unit (CPU), the protected model may not be read or written during its life cycle for the CPU, and the contents of the protected model may be protected.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ".

Figure 1:
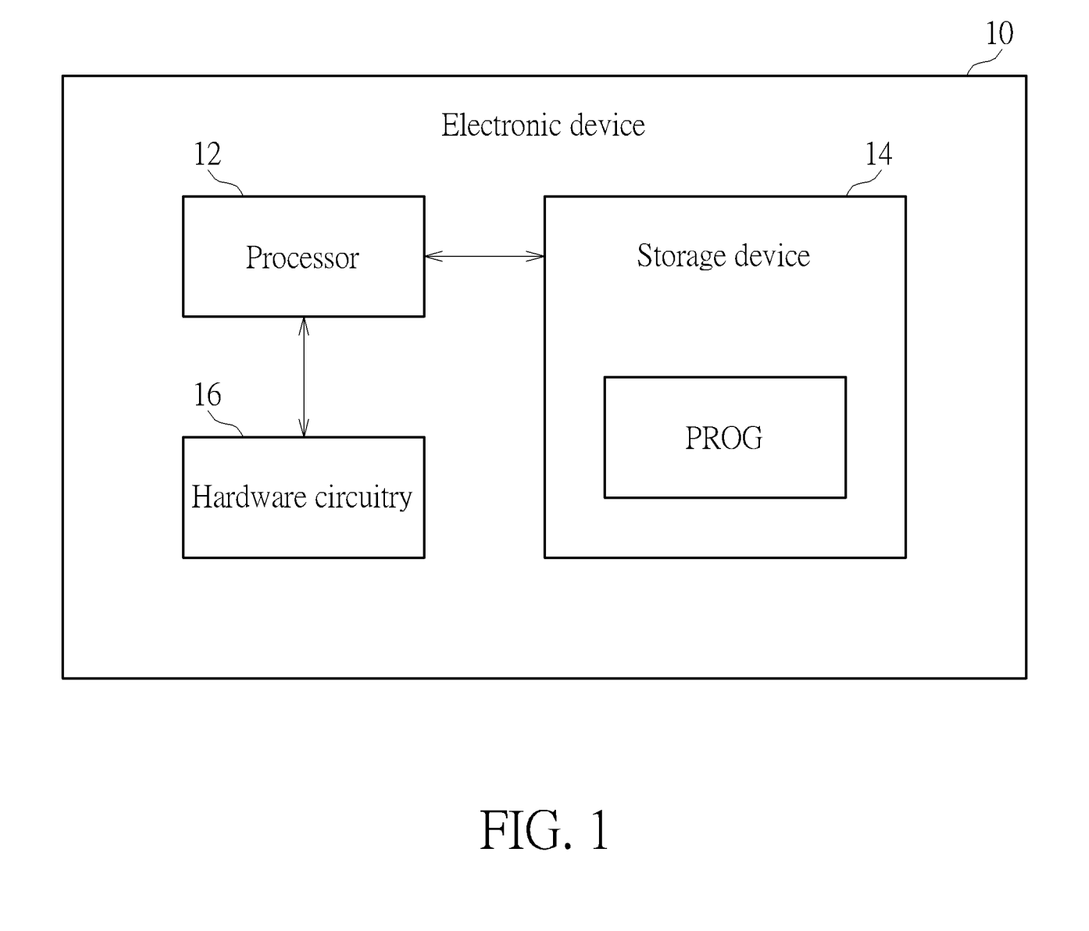
FIG. 1 is a diagram illustrating an electronic device according to an embodiment of the present invention

FIG. 1 is a diagram illustrating an electronic device 10 according to an embodiment of the present invention. Byway of example, but not limitation, the electronic device 10 maybe a portable device such as a smartphone or a tablet. The electronic device 10 may include a processor 12, a storage device 14, and hardware circuitry 16. The processor 12 maybe a single-core processor or a multi-core processor. The storage device 14 is a non-transitory machine-readable medium, and is arranged to store computer program code PROG. The processor 12 is equipped with software execution capability. The computer program code PROG may include a plurality of software modules. As a result, when loaded and executed by the processor 12, the computer program code PROG instructs the processor 12 to perform designated functions of the software modules. The electronic device 10 may be regarded as a computer system using a computer program product that includes a computer-readable medium containing the computer program code PROG. The hardware circuitry 16 is pure hardware that may consist of logic gates only, and performs designated functions without software execution. Regarding a system for model protection as proposed by the present invention, it may be embodied on the electronic device 10. For example, the system for model protection may include software-based functions implemented by the computer program code PROG running on the processor 12 and hardware-based functions implemented by the hardware circuitry 16.

Figure 2:
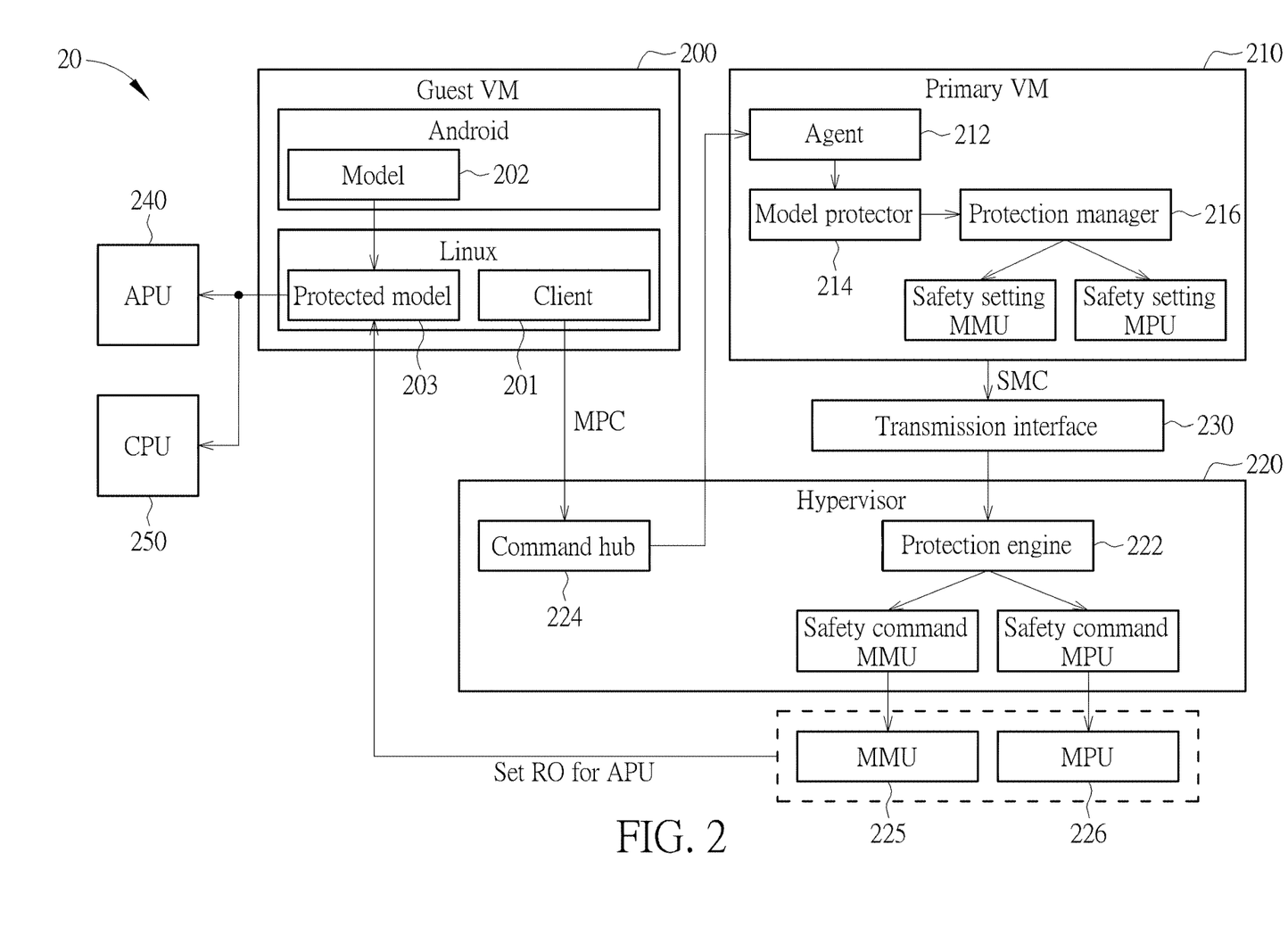
FIG. 2 is a diagram illustrating a system for model protection according to an embodiment of the present invention.

FIG. 2 is a diagram illustrating a system 20 for model protection according to an embodiment of the present invention. The system 20 may include a processor (e.g. a central processing unit (CPU) 250 that acts as the processor 12 shown in FIG. 1), a transmission interface 230, and a direct memory access (DMA) circuit (e.g. an accelerated processing unit (APU) 240). The processor may be arranged to execute software modules, including a guest VM 200, a primary VM 210, and a hypervisor 220. In addition, the processor maybe further arranged to execute a command hub 224 that is a software module integrated in the hypervisor 220, but the present invention is not limited thereto. In some embodiments, the command hub 224 may be a hardware component external to the hypervisor 220 executed on the processor, and the command hub 224 may be a part of the hardware circuitry 16 shown in FIG. 1. The guest VM 200 may include a model (e.g. an AI model) 202, and may be arranged to send a model protection command MPC to the command hub 224. For example, an operating system (OS), such as an Android system with a Linux kernel, may run on the guest VM 200, wherein at least one client 201 in the Linux kernel may send the model protection command MPC to the command hub 224. The primary VM 210 may include an agent 212, a model protector 214, and a protection manager 216. The command hub 224 may be arranged to broadcast the model protection command MPC to the agent 212, and perform communications between the guest VM 200 and the primary VM 210.

The agent 212 may be arranged to receive the model protection command MPC sent from the command hub 224. The model protector 214 may be arranged to receive the model protection command MPC from the agent 212, and refer to the model protection command MPC to manage and configure a protection setting for a protected model 203 that is derived from the model 202. In this embodiment, the model 202 may be injected to the Linux kernel of the Android system for inference, and the protected model 203 maybe derived from the model 202 injected to the Linux kernel. In some embodiments, the model 202 may be injected to a shared memory between the Android system running on the guest VM 200 and the Linux kernel of the Android system for inference, and the protected model 203 may be derived from the model 202 injected to the shared memory. In some embodiments, the model 202 may be a crypted model, and the protected model 203 may be generated by performing decryption on the model 202. Further details will be described later, with reference to the accompanying drawings.

The protection manager 216 may be arranged to manage and configure a safety protection component according to the protection setting provided by the model protector 214, wherein the safety protection component may include a Memory Management Unit (MMU) 225 and/or a Memory Protection Unit (MPU) 226. In addition, the primary VM 210 may be arranged to send a safety setting command SAFETY_MODEL_COMMAND (labeled as "SMC" in FIG. 2) to the hypervisor 220 through the transmission interface 230.

The transmission interface 230 may be arranged to bind the primary VM 210 to the hypervisor 220, and perform communications between the primate VM 210 and the hypervisor 220. In this way, only primary VM 210 that is bound to the hypervisor 220 by the transmission interface 230 is capable of communicating with the hypervisor 220 (e.g. sending the safety setting command SAFETY_MODEL_COMMAND to the hypervisor 220 for subsequent operations), which prevents other illegal users from utilizing the system 20. It should be noted that, the transmission interface 230 may be implemented by software or hardware. That is, the transmission interface 230 may be a software module executed by the processor, or may be a part of the hardware circuitry 16 shown in FIG. 1.

The hypervisor 220 may include a protection engine 222, and the protection engine 222 may be arranged to receive the safety setting command SAFETY_MODEL_COMMAND sent by the primary VM 210 through the transmission interface 230, and manage and configure the safety protection component (e.g. the MMU 225 and/or the MPU 226) according to the safety setting command SAFETY_MODEL_COMMAND, to set a read-only mode (labeled as "RO" in FIG. 2) of the protected model 203 for the APU 240. In some embodiments, the protection engine 222 may be further arranged to set a no-read/write mode of the protected model 203 for the CPU 250 by managing and configuring the safety protection component (e.g. the MMU 225 and/or the MPU 226) according to the safety setting command SAFETY_MODEL_COMMAND, and the protected model 203 may not be read or written during its life cycle for the CPU 250 (e.g. the contents of the protected model 203 may be protected). By setting the read-only mode of the protected model 203 for the APU 240, the protected model 203 may not be modified during its life cycle for the APU 240 (e.g. the integrity of the protected model 203 may be protected). In this way, since the Android system or the Linux kernel may not modify the protected model 203 during inference, other illegal users may not utilize the protected model 203 to perform attacks through the APU 240, and may not perform attacks on the protected model 203 when the APU 240 performs computations on the protected model 203.

Figure 3:
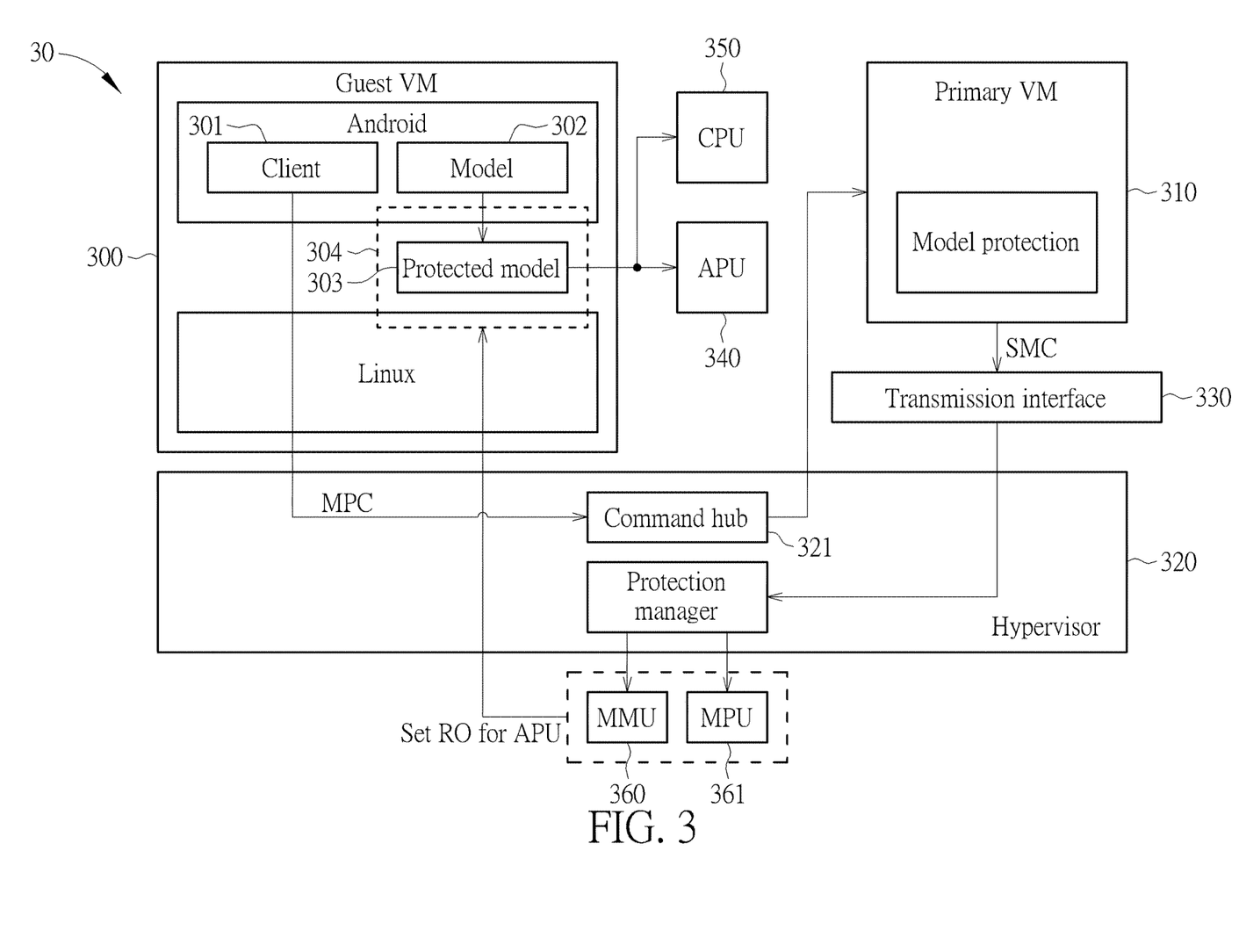
FIG. 3 is a diagram illustrating a system for model protection according to another embodiment of the present invention.

FIG. 3 is a diagram illustrating a system 30 for model protection according to another embodiment of the present invention. The system 30 may include a processor (e.g. a CPU 350 that acts as the processor 12 shown in FIG. 1), a transmission interface 330, and a DMA circuit (e.g. an APU 340). The processor may be arranged to execute software modules, including a guest VM 300, a primary VM 310, and a hypervisor 320, wherein a command hub 321 is a software module integrated in the hypervisor 320. An Android system with a Linux kernel may run on the guest VM 300, and the guest VM 300 may include a model (e.g. an AI model) 302, wherein at least one client 301 in the Android system may send a model protection command MPC to the primary VM 310 through the command hub 321. In this embodiment, the model 302 maybe injected from the Android system running on the guest VM 300 to a shared memory 304 between the Android system and the Linux kernel of the Android system for inference. For example, the shared memory 304 may be bound to a specific application (APP), such as a legal app for the system 30, and only the model of the specific APP is capable of being injected to the shared memory 304.

The primary VM 310 may be arranged to: receive the model protection command MPC from the command hub 321; refer to the model protection command MPC to manage and configure the protection setting (i.e. the model protection) for a protected model 303 that is derived from the model 302 injected to the shared memory 304; and manage and configure the safety protection component (e.g. an MMU 360 and/or an MPU 361) according to the protection setting. For brevity, "Model protection" that is labeled in FIG. 3 may include the agent, the model protector, the protection manager, and the above-mentioned operations of the primary VM 310. In addition, the primary VM 310 maybe arranged to send a safety setting command SAFETY_MODEL_COMMAND (labeled as "SMC" in FIG. 3) to the hypervisor 320 through the transmission interface 330. The hypervisor 320 may be arranged to receive the safety setting command SAFETY_MODEL_COMMAND sent by the primary VM 310 through the transmission interface 330, and manage and configure the safety protection component (e.g. the MMU 360 and/or the MPU 361) according to the safety setting command SAFETY_MODEL_COMMAND (for brevity, "Protection manager" that is labeled in FIG. 3 may include the protection engine and the above-mentioned operations of the hypervisor 320), to set a read-only mode (labeled as "RO" in FIG. 3) of the protected model 303 for the APU 340. For brevity, similar descriptions for this embodiment are omitted here.

Figure 4:
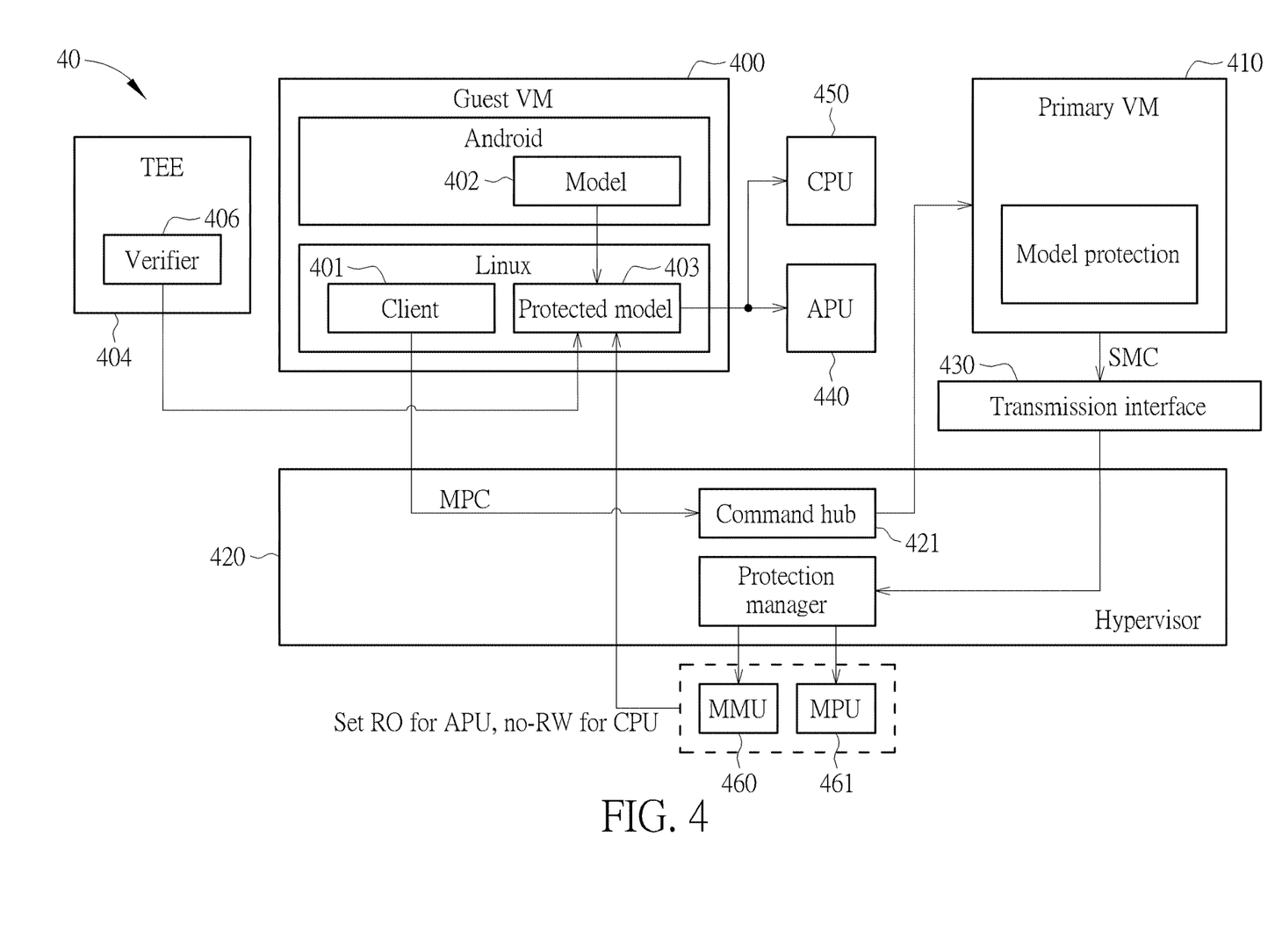
FIG. 4 is a diagram illustrating relationship between a system for model protection and a verifier included in an isolated execution environment according to an embodiment of the present invention.

FIG. 4 is a diagram illustrating relationship between a system for model protection and a verifier included in an isolated execution environment according to an embodiment of the present invention. The system 40 may include a processor (e.g. a CPU 450 that acts as the processor 12 shown in FIG. 1), a transmission interface 430, and a DMA circuit (e.g. an APU 440). The processor may be arranged to execute software modules, including a guest VM 400, a primary VM 410, and a hypervisor 420, wherein a command hub 421 is a software module integrated in the hypervisor 420. An Android system with a Linux kernel may run on the guest VM 400, and the guest VM 400 may include a model (e.g. an AI model) 402 in the android system, wherein at least one client 401 in the Linux kernel may send a model protection command MPC to the primary VM 410 through the command hub 421. In this embodiment, the model 402 may be injected from the Android system to the Linux kernel for inference. The processor may be further arranged to execute an isolated execution environment, such as a trusted execution environment (TEE) 404, wherein the TEE 404 may include a verifier 406, and the verifier 406 may be arranged to verify a signature of a protected model 403 (which is derived from the model 402 injected from the Android system running on the guest VM 400 to the Linux kernel of the Android system) , to ensure safety of the protected model 403 before the computations are performed on the protected model 403 by the APU 440.

The primary VM 410 may be arranged to: receive the model protection command MPC from the command hub 421; refer to the model protection command MPC to manage and configure the protection setting (i.e. the model protection) for the protected model 403; and manage and configure the safety protection component (e.g. an MMU 460 and/or an MPU 461) according to the protection setting. For brevity, "Model protection" that is labeled in FIG. 4 may include the agent, the model protector, the protection manager, and the above-mentioned operations of the primary VM 410. In addition, the primary VM 410 may be arranged to send a safety setting command SAFETY_MODEL_COMMAND (labeled as "SMC" in FIG. 4) to the hypervisor 420 through the transmission interface 430.

The hypervisor 420 may be arranged to receive the safety setting command SAFETY_MODEL_COMMAND sent by the primary VM 410 through the transmission interface 430, and manage and configure the safety protection component (e.g. the MMU 460 and/or the MPU 461) according to the safety setting command SAFETY_MODEL_COMMAND (for brevity, "Protection manager" that is labeled in FIG. 4 may include the protection engine and the above-mentioned operations of the hypervisor 420), to set a read-only mode (labeled as "RO" in FIG. 4) of the protected model 403 for the APU 440. By setting the read-only mode of the protected model 403 for the APU 440, the integrity of the protected model 403 may be protected. In addition to the read-only mode of the protected model 403 for the APU 440, the hypervisor 420 may be further arranged to set a no-read/write mode (labeled as "no-RW" in FIG. 4) of the protected model 403 for the CPU 450. By setting the no-read/write mode of the protected model 403 for the CPU 450, the contents of the protected model 403 maybe protected. For brevity, similar descriptions for this embodiment are omitted here.

Figure 5:
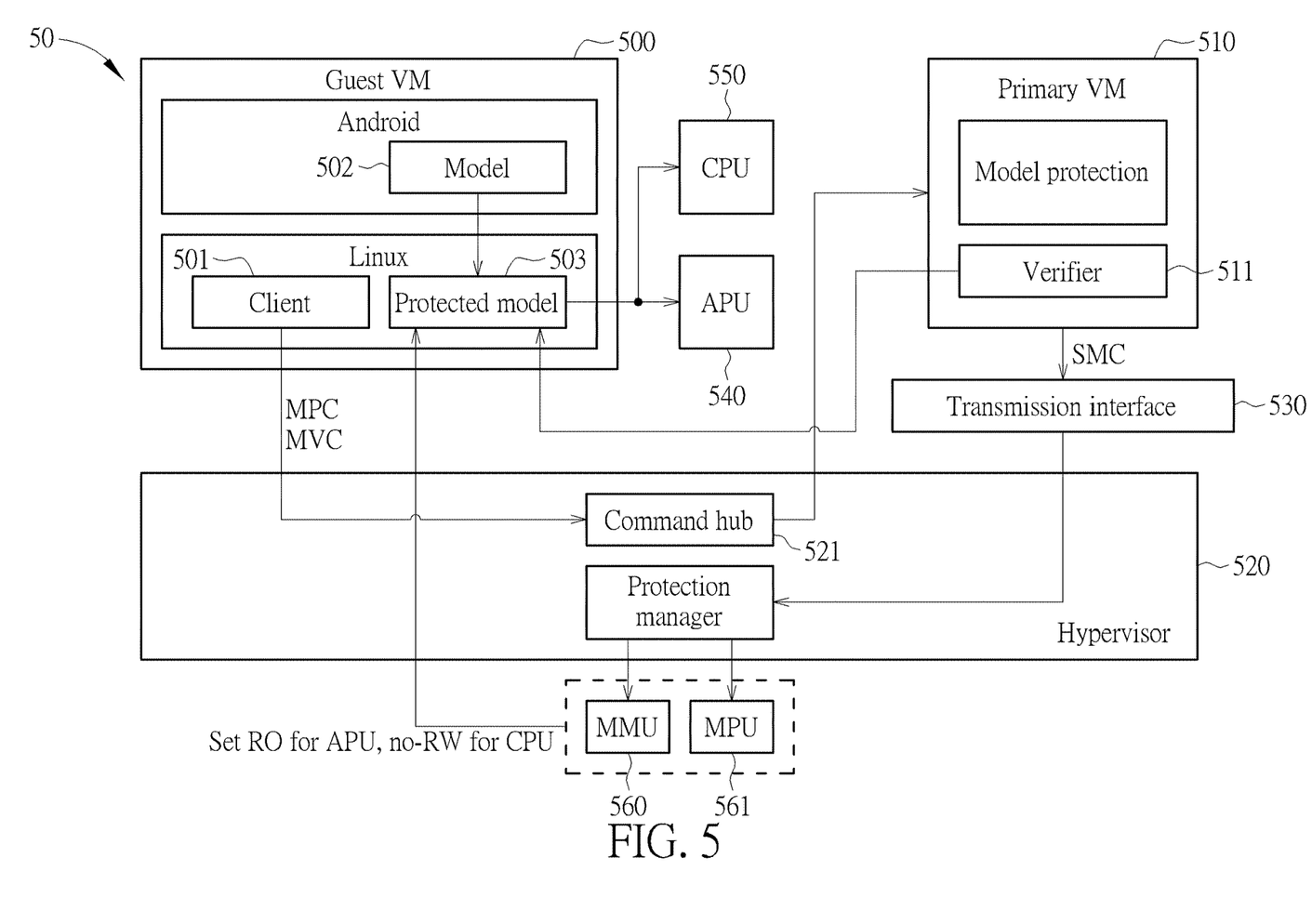
FIG. 5 is a diagram illustrating relationship between a system for model protection and a verifier included in a primary virtual machine (VM) according to an embodiment of the present invention.

FIG. 5 is a diagram illustrating relationship between a system 50 for model protection and a verifier included in a primary VM according to an embodiment of the present invention. The system 50 may include a processor (e.g. a CPU 550 that acts as the processor 12 shown in FIG. 1), a transmission interface 530, and a DMA circuit (e.g. an APU 540). The processor may be arranged to execute software modules, including a guest VM 500, a primary VM 510, and a hypervisor 520, wherein a command hub 521 is a software module integrated in the hypervisor 520. An Android system with a Linux kernel may run on the guest VM 500, and the guest VM 500 may include a model (e.g. an AI model) 502 in the Android system, wherein at least one client 501 in the Linux kernel may send a model protection command MPC to the primary VM 510 through the command hub 521, and the model 502 may be injected from the Android system to the Linux kernel for inference.

The difference between the system 40 shown in FIG. 4 and the system 50 shown in FIG. 5 is that, in the system 50, the processor (e.g. the CPU 550) is modified to not execute an isolated execution environment, and the at least one client 501 in the Linux kernel may further send a model verification command MVC to the primary VM 510 through the command hub 521 integrated in the hypervisor 520. The primary VM 510 may further include a verifier 511, and the verifier 511 may be arranged to verify a signature of a protected model 503 (which is derived from the model 502 injected to the Linux kernel of the Android system running on the guest VM 500) according to the model verification command MVC, to ensure safety of the protected model 503 before the computations are performed on the protected model 503 by the APU 550. For brevity, similar descriptions for this embodiment are omitted here.

Figure 6:
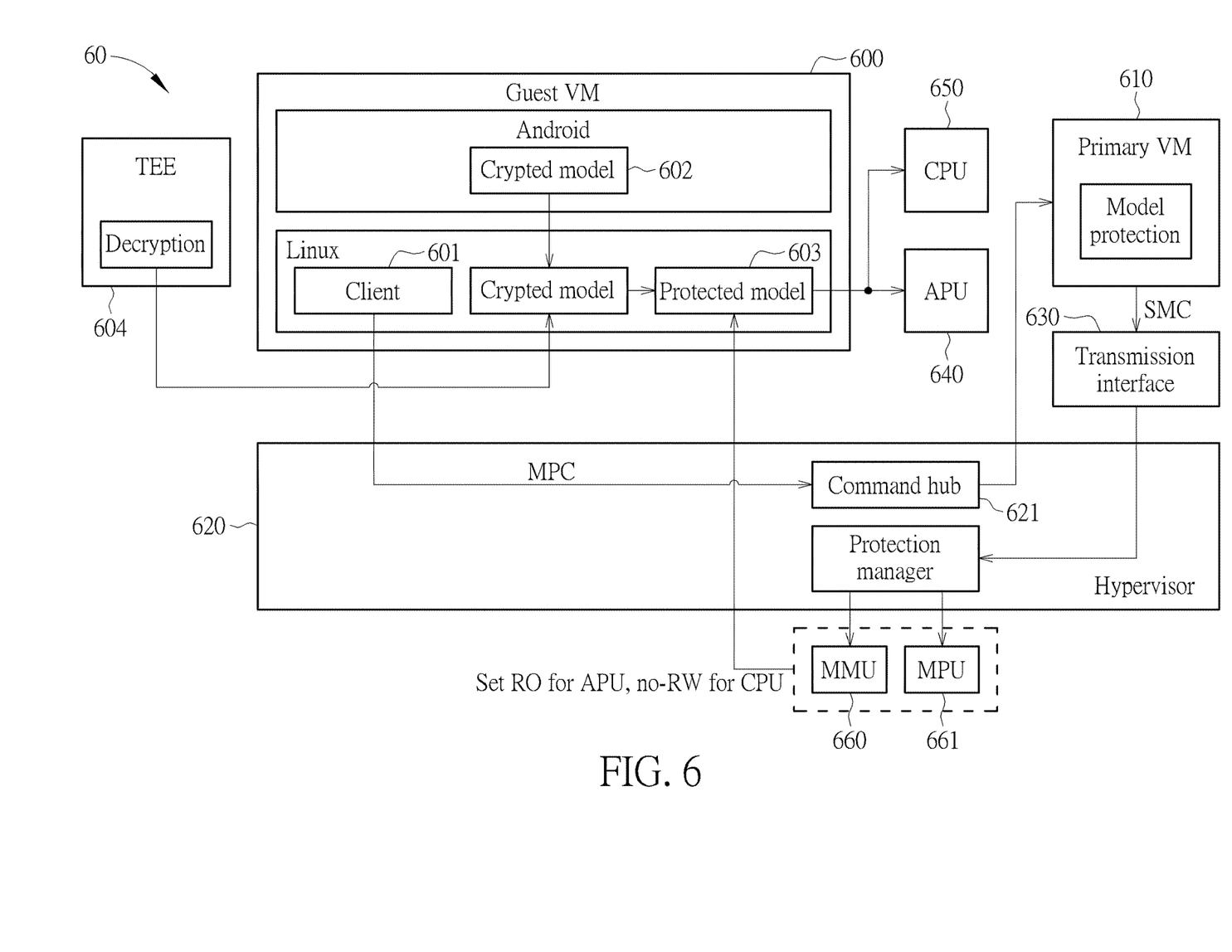
FIG. 6 is a diagram illustrating relationship between a system for model protection and an isolated execution environment for model decryption according to an embodiment of the present invention.

FIG. 6 is a diagram illustrating relationship between a system 60 for model protection and an isolated execution environment for model decryption according to an embodiment of the present invention. The system 60 may include a processor (e.g. a CPU 650 that acts as the processor 12 shown in FIG. 1), a transmission interface 630, and a DMA circuit (e.g. an APU 640). The processor may be arranged to execute software modules, including a guest VM 600, a primary VM 610, and a hypervisor 620, wherein a command hub 621 is a software module integrated in the hypervisor 620. An Android system with a Linux kernel may run on the guest VM 600, and the guest VM 600 may include a crypted model (e.g. a crypted AI model) 602 in the Android system, wherein at least one client 601 in the Linux kernel may send a model protection command MPC to the primary VM 610 through the command hub 621. In this embodiment, the crypted model 602 may be injected from the Android system to the Linux kernel for inference. The processor may be further arranged to execute an isolated execution environment, such as a trusted execution environment (TEE) 604, and the TEE 604 may be arranged to perform decryption on the crypted model 602 to generate a protected model 603.

The primary VM 610 may be arranged to: receive the model protection command MPC from the command hub 621; refer to the model protection command MPC to manage and configure the protection setting (e.g. the model protection) for the protected model 603; and manage and configure the safety protection component (e.g. an MMU 660 and/or an MPU 661) according to the protection setting. For brevity, "Model protection" that is labeled in FIG. 6 may include the agent, the model protector, the protection manager, and the above-mentioned operations of the primary VM 610. In addition, the primary VM 610 may be arranged to send a safety setting command SAFETY_MODEL_COMMAND (labeled as "SMC" in FIG. 6) to the hypervisor 620 through the transmission interface 630.

The hypervisor 620 may be arranged to receive the safety setting command SAFETY_MODEL_COMMAND sent by the primary VM 610 through the transmission interface 630, and manage and configure the safety protection component (e.g. the MMU 660 and/or the MPU 661) according to the safety setting command SAFETY_MODEL_COMMAND (for brevity, "Protection manager" that is labeled in FIG. 6 may include the protection engine and the above-mentioned operations of the hypervisor 620), to set a read-only mode (labeled as "RO" in FIG. 6) of the protected model 603 for the APU 640. In addition to the read-only mode of the protected model 603 for the APU 640, the hypervisor 620 may be further arranged to set a no-read/write mode (labeled as "no-RW" in FIG. 6) of the protected model 603 for the CPU 650. For brevity, similar descriptions for this embodiment are omitted here.

Figure 7:
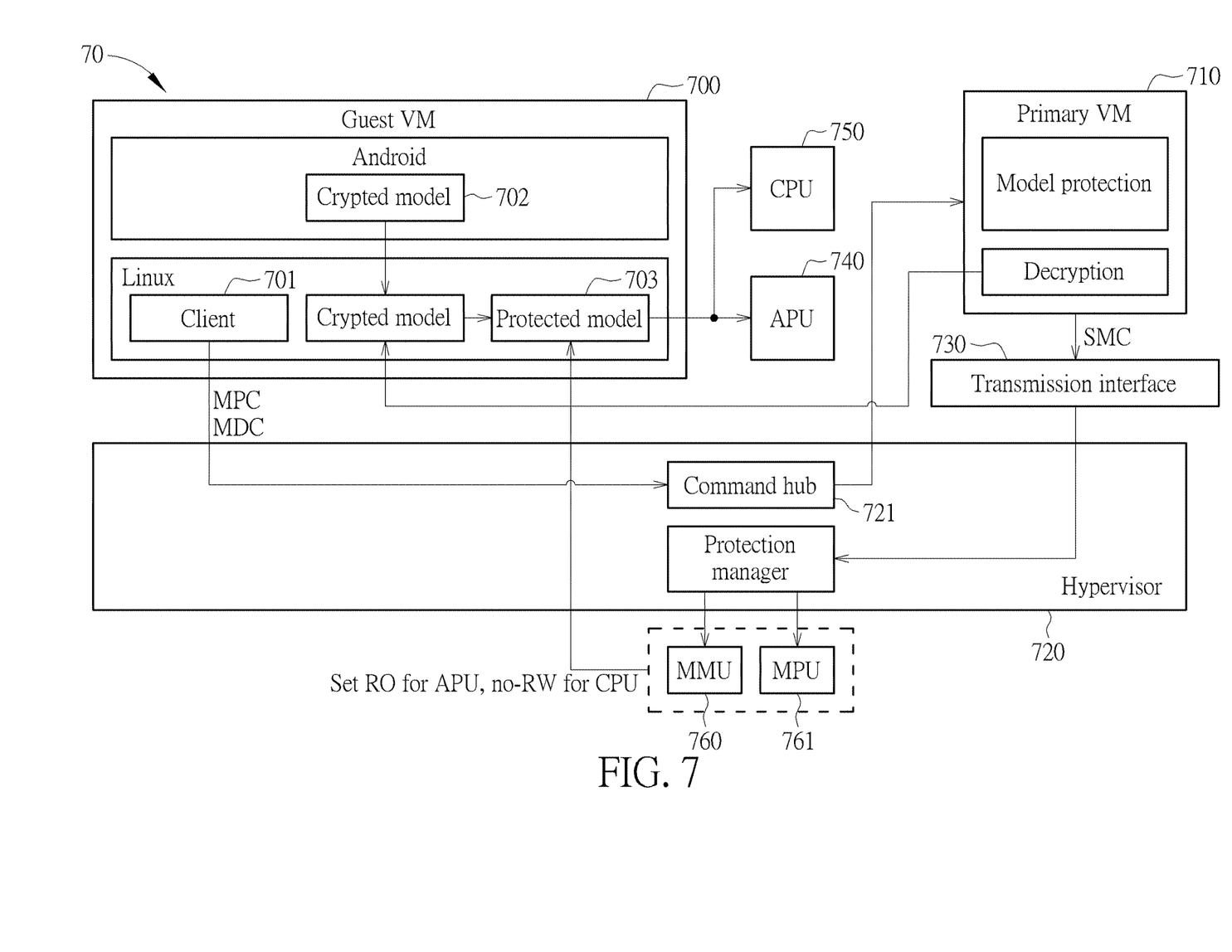
FIG. 7 is a diagram illustrating relationship between a system for model protection and a primary VM of the system for model decryption according to an embodiment of the present invention.

FIG. 7 is a diagram illustrating relationship between a system 70 for model protection and a primary VM of the system for model decryption according to an embodiment of the present invention. The system 70 may include a processor (e.g. a CPU 750 that acts as the processor 12 shown in FIG. 1), a transmission interface 730, and a DMA circuit (e.g. an APU 740). The processor may be arranged to execute software modules, including a guest VM 700, a primary VM 710, and a hypervisor 720, wherein a command hub 721 is a software module integrated in the hypervisor 720. An Android system with a Linux kernel may run on the guest VM 700, and the guest VM 700 may include a crypted model (e.g. a crypted AI model) 702, wherein at least one client 701 in the Linux kernel may send a model protection command MPC to the primary VM 710 through the command hub 721, and the crypted model 702 may be injected from the Android system to the Linux kernel for inference.

The difference between the system 60 shown in FIG. 6 and the system 70 shown in FIG. 7 is that, in the system 70, the processor (e.g. the CPU 750) is modified to not execute an isolated execution environment, and the at least one client 701 in the Linux kernel may further send a model decryption command MDC to the primary VM 710 through the command hub 721 integrated in the hypervisor 720. The primary VM 710 may be equipped with model decryption capability, and may be arranged to perform decryption on the crypted model 702 to generate a protected model 703. For brevity, similar descriptions for this embodiment are omitted here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system for artificial intelligence (AI) model protection, comprising:
    a processor, arranged to execute:
        a guest virtual machine (VM), wherein the guest VM comprises an AI model, and the guest VM is arranged to send at least one command to a command hub;
        a primary VM, wherein the primary VM is arranged to receive the at least one command sent from the command hub, and refer to the at least one command to manage and configure a protection setting for a protected AI model that is derived from the AI model; and
        a hypervisor, arranged to receive a safety setting command sent by the primary VM, and manage and configure a safety protection component according to the safety setting command, to set a read-only mode of the protected AI model; and
    a transmission interface, arranged to bind the primary VM to the hypervisor, and perform communications between the primary VM and the hypervisor.

2. The system of claim 1, wherein the processor is further arranged to execute the command hub that is a software module integrated in the hypervisor.

3. The system of claim 1, further comprising:
    the command hub;
    wherein the command hub is a hardware component external to the hypervisor executed on the processor.

4. The system of claim 1, wherein the AI model is injected to a kernel of an operating system running on the guest VM, and the protected AI model is derived from the AI model injected to the kernel.

5. The system of claim 1, wherein the AI model is injected to a shared memory between an operating system running on the guest VM and a kernel of the operating system, and the protected AI model is derived from the AI model injected to the shared memory.

6. The system of claim 1, wherein the processor is further arranged to execute:
    an isolated execution environment, arranged to verify a signature of the protected AI model, to ensure safety of the protected AI model before the computations are performed on the protected AI model by a direct memory access (DMA) circuit.

7. The system of claim 6, wherein the hypervisor is further arranged to set a no-read/write mode of the protected AI model by managing and configuring the safety protection component according to the safety setting command.

8. The system of claim 1, wherein the at least one command comprises a first command for AI model protection and a second command for AI model verification, and the primary VM further comprises:

a verifier, arranged to verify a signature of the protected AI model according to the second command, to ensure safety of the protected AI model before the computations are performed on the protected AI model by a direct memory access (DMA) circuit.

9. The system of claim 1, wherein the AI model is a crypted AI model, and the processor is further arranged to execute:

an isolated execution environment, arranged to perform decryption on the crypted AI model to generate the protected AI model.

10. The system of claim 1, wherein the AI model is a crypted AI model, the at least one command comprises a first command for AI model protection and a second command for AI model decryption, and the primary VM is further arranged to perform decryption on the crypted AI model according to the second command, to generate the protected AI model.

11. The system of claim 1, wherein the safety protection component comprises a memory management unit (MMU) or a memory protection unit (MPU).

12. A non-transitory machine-readable medium for storing a program code, wherein when loaded and executed by a processor, the program code instructs the processor to execute:

a guest virtual machine (VM), wherein the guest VM comprises an artificial intelligence (AI) model, and the guest VM is arranged to send at least one command to a command hub;

a primary VM, wherein the primary VM is arranged to receive the at least one command sent from the command hub, and refer to the at least one command to manage and configure a protection setting for a protected AI model that is derived from the AI model; and a hypervisor, arranged to receive a safety setting command sent by the primary VM, and manage and configure a safety protection component according to the safety setting command, to set a read-only mode of the protected AI model;

wherein the primary VM is bound to the hypervisor when communications between the primary VM and the hypervisor is performed.

13. The non-transitory machine-readable medium of claim 12, wherein the program code further instructs the processor to execute the command hub that is a software module integrated in the hypervisor.

14. The non-transitory machine-readable medium of claim 12, wherein the command hub is implemented by a hardware component.

15. The non-transitory machine-readable medium of claim 12, wherein the AI model is injected to a kernel of an operating system running on the guest VM, and the protected AI model is derived from the AI model injected to the kernel.

16. The non-transitory machine-readable medium for of claim 12, wherein the AI model is injected to a shared memory between an operating system running on the guest VM and a kernel of the operating system, and the protected AI model is derived from the AI model injected to the shared memory.

17. The non-transitory machine-readable medium for storing a program code of claim 12, wherein the program code further instructs the processor to execute an isolated execution environment, and the isolated execution environment is arranged to verify a signature of the protected AI model, to ensure safety of the protected AI model before the computations are performed on the protected AI model.

18. The non-transitory machine-readable medium of claim 17, wherein the hypervisor is further arranged to set a no-read/write mode of the protected AI model by managing and configuring the safety protection component according to the safety setting command.

19. The non-transitory machine-readable medium of claim 12, wherein the AI model is a crypted AI model, the program code further instructs the processor to execute an isolated execution environment, and the isolated execution environment is arranged to perform decryption on the crypted AI model to generate the protected AI model.

* * * * *